United States Patent [19]

Barr

[11] 4,455,036
[45] Jun. 19, 1984

[54] KING PIN FOR TRACTOR TRAILER FIFTH WHEEL COUPLING

[76] Inventor: William A. Barr, Gibson Island, Md. 21056

[21] Appl. No.: 410,915

[22] Filed: Aug. 24, 1982

[51] Int. Cl.³ .............................................. B62D 53/10
[52] U.S. Cl. .................................... 280/432; 280/434
[58] Field of Search ................. 280/432, 433, 434, 435

[56] References Cited

U.S. PATENT DOCUMENTS

| 1,981,233 | 11/1934 | Harris | 280/434 |
| 2,077,484 | 4/1937 | King | 280/435 |
| 2,736,574 | 2/1956 | Braunberger | 280/434 |
| 2,925,286 | 2/1960 | Hodges, Jr. et al. | 280/434 |

FOREIGN PATENT DOCUMENTS 564371 11/1932 Fed. Rep. of Germany ...... 280/434

OTHER PUBLICATIONS

1981 SAE Handbook, SAE J700b, p. 37.21.

Primary Examiner—Joseph F. Peters, Jr.
Assistant Examiner—Kenneth R. Rice
Attorney, Agent, or Firm—Schrivener, Clarke, Scrivener and Johnson

[57] ABSTRACT

A king pin for a tractor trailer coupling is disclosed. The king pin is substantially conventional except that the lower flange thereof, which is presently standardized to have less diameter than the upper part of the king pin, is made predeterminedly larger than the upper part so that it cannot be received in the usual recess at the upper end of the coupler jaw when closed, or when the jaw is opened the flange positively prevents the jaw from closing. Thus a trailer can never be towed at all by partial seating of the flange of a misaligned king pin in the upper recess of a closed jaw as now can occur with a standardized king pins resulting in unexpected and dangerous separation of the tractor and trailer on the open highway.

2 Claims, 9 Drawing Figures

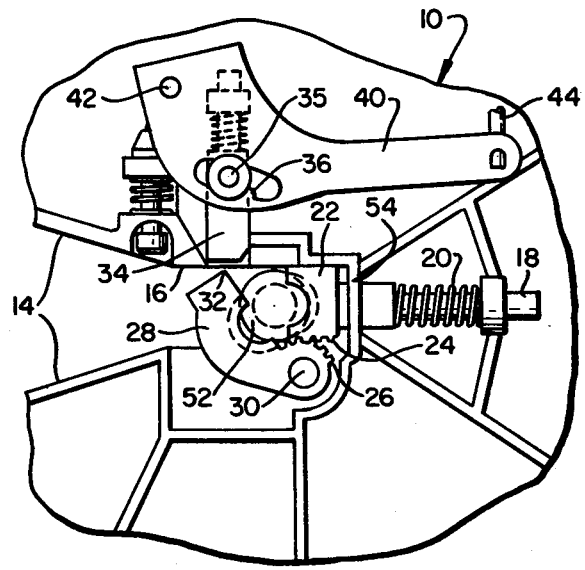
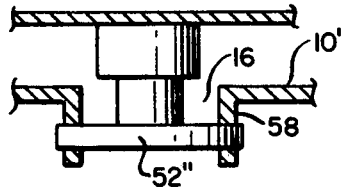
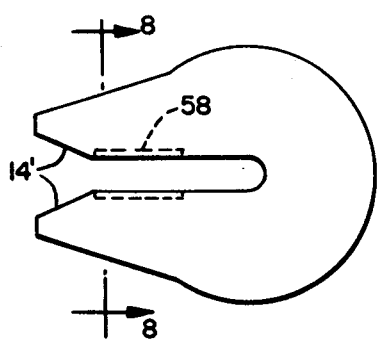
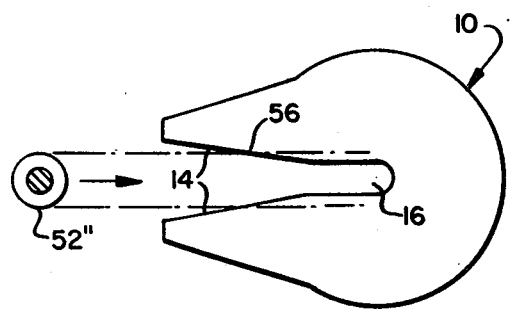
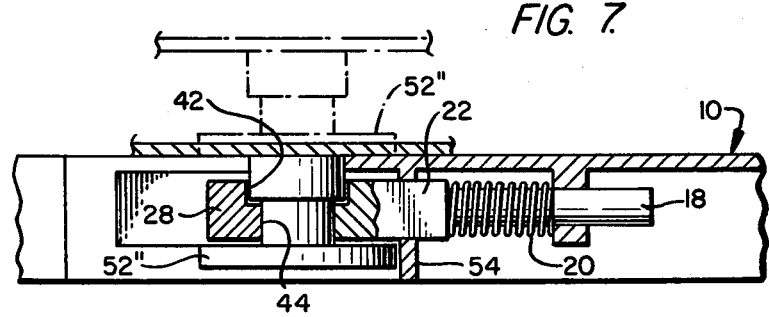

KING PIN FOR TRACTOR TRAILER FIFTH WHEEL COUPLING

This invention relates to king pins for use in tractor trailer fifth wheel couplings and more particularly to a king pin designed to obviate dangerous mis-coupling of tractor trailers.

A well known widely used fifth wheel coupling comprises an axially movable spring loaded plunger at the closed end of a slot in the usual fifth wheel plate. The plunger has an enlarged head on one side of which is a rack engaging a gear sector integral with a jaw pivoted at one side of the slot. In normal operation the operator backs the tractor until the king pin enters the slot and engages the plunger head moving it forwardly against the loading of its spring. This causes the rack on the plunger head to drive the sector on the jaw to swing the latter across the slot and in so doing it triggers a bolt clear of a detent obstruction in a slot in an operating lever permitting a spring to slide the bolt behind the jaw and lock it in its closed position.

The king pin itself has a first upper cylindrical portion, an intermediate cylindrical portion of reduced diameter and a lower cylindrical portion which defines a flange. When the jaw is in its closed position it defines with the plunger head a vertical opening whose upper cylindrical portion is recessed to substantially closely encompass the upper portion of the pin and a lower cylindrical portion of reduced diameter to substantially closely encompass the intermediate portion of the pin, with the flange of the pin being disposed beneath the cooperating plunger head and closed jaw to prevent vertical separation of the pin from the fifth wheel plate.

In accordance with the 1982 standarized specification for fifth wheel king pins, (SAE J700b in the 1982 SAE Handbook, page 37.19) the upper cylindrical portion of the king pin is specified as having a diameter of 2.875±0.005 in.; the intermediate portion having a diameter of 2.000±0.005 in. and the lower portion or flange as having a diameter of 2.8125±0.015 in., which is to say that the diameter of the flange is less than the diameter of the upper portion of the pin.

With a coupling arrangement as described above, should the trailer landing wheels be inadvertently extended too far so that the lower flange, rather than the upper part of the king pin, is aligned with the upper recessed end of the plunger head, when the tractor is backed up the flange engages the upper end of the plunger head causing it to operate in a normal fashion including closing of the jaw and the triggering of the bolt into locking position behind the jaw. Unless an operator looks very carefully at the coupling, he will not notice that instead of the king pin flange being beneath the opening defined by the plunger head and closed jaw it is actually seated within the recess at the upper end of the opening and is free to separate vertically from the fifth wheel plate whenever road conditions dictate. Usually the connection is sufficiently secure that the driver can safely enter traffic at an initial slow speed and, if the road is smooth, he can accelerate safely to highway speed, but the moment the road becomes rough there need be only slight relative vertical movement between the tractor and trailer to enable the pin flange to jump out of the shallow recess whereupon the out-of-control trailer can careen into traffic flow resulting in almost certain severe bodily injury. Inspection of the coupling following such an accident reveals nothing extraordinary except that the pin apparently vertically separated from the fifth wheel plate without damage to either the pin or coupling mechanism, it not heretofore having been realized that the actual problem was as is described above; that is, the elevated pin flange caused the jaw to close and lock, not around the pin, but beneath it.

The SAE standard for king pins has been unchanged since at least January 1940, (see page 788, 1960 SAE Handbook) but the statistics on the number of accidents that may have been caused by the above described fault are unknown, it only having been recently determined as a result of litigation that such accidents can and have occurred.

It is the broad object of the present invention to so construct a king pin of a trailer that the foregoing type of accident cannot occur.

More specifically, it is an object of the invention to prevent such accidents by so constructing the king pin that even if it should be unduly elevated and able to effect closing and locking of the jaw beneath the pin, nevertheless the king pin still cannot be partially engaged by the closed jaw and thus as a result that as soon as a driver moves the tractor, the king pin drops clear of the fifth wheel and cannot be dragged to the open road in the mistaken belief that the king pin is correctly coupled to the fifth wheel.

More specifically it is an object of the invention to achieve the foregoing object by making the king pin flange predeterminedly larger in diameter than the upper cylindrical part of the king pin so that either the flange of the king pin cannot enter the recess in the closed jaw and plunger head should they have been moved sufficiently so that they close beneath the flange (as might happen if the lower edge of the flange merely brushed the upper edge of the plunger head) or because of the relative vertical location of the flange, the jaw is simply unable to close sufficiently around the flange to trigger the bolt, and, thus as soon as the driver moves the tractor, the front end of the trailer, having no attachment with the tractor, drops to the ground.

Still another object of the invention is to provide a king pin with an enlarged flange wherein the pin cannot enter the slot in the plate unless the flange is disposed in its proper place beneath the slot.

Other objects and their attendant advantages will become apparent as the following detailed description is read in conjunction with the accompanying drawings wherein:

FIG. 4 is a plan view similar to FIG. 2 except showing the plunger and locking jaw engaging the flange of a pin constructed in accordance with the invention and being thereby prevented from closing;

FIG. 5 is a schematic side elevational view showing a modification of the king pin of the invention;

FIG. 6 is a top plan view of the arrangement of FIG. 5;

FIG. 7 is an enlarged vertical cross sectional view of the arrangement of FIG. 6 showing in full lines the location of the pin when initially disposed in its proper place and in phantom lines its position when initially positioned above its proper place;

FIG. 8 is a vertical cross sectional view of a king pin constructed in accordance with the invention and a modified fifth wheel plate taken substantially on the line 8—8 of FIG. 9; and FIG. 9 is a plan view on a reduced scale of the modified plate of FIG. 8.

Figure 1:
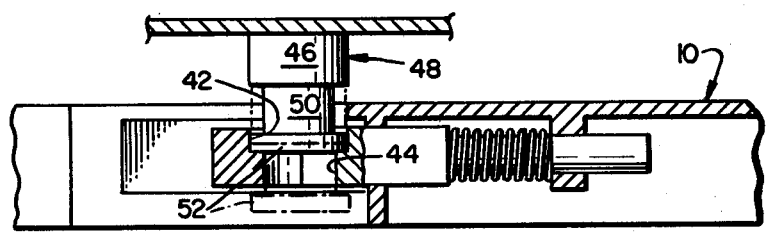
FIG. 1 is a vertical cross sectional view of a prior art king pin whose flange instead of being in the illustrated normal phantom line position is seated in the recess at the upper end of the opening defined by the closed plunger head and jaw.
Figure 2:
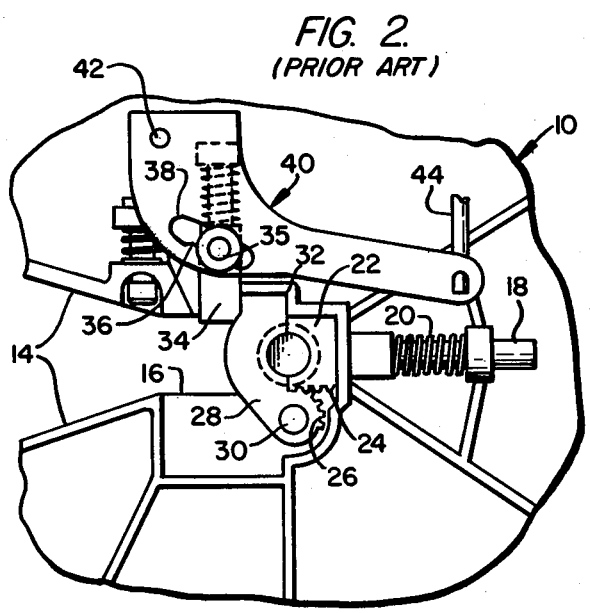
FIG. 2 is an underneath plan view of the prior art arrangement of FIG. 1.

Referring now to the drawings, FIGS. 1 and 2 illustrate a well known and widely used tractor trailer coupling, the essential features of which appear in the patent to Harris U.S. Pat. No. 1,981,233 which issued Nov. 20, 1934. The coupling comprises a fifth wheel plate 10 rockingly mounted on a tractor by means of a transverse trunnion 12 as seen in FIG. 5. The plate has a throat 14 having converging side edges leading to a slot 16 at the closed end of which is a plunger 18 axially urged by a spring 20 towards the open end of the slot. The plunger 18 has an enlarged head 22 on one side edge of which are rack teeth 24 which engage the teeth of a sector gear 26 integral with a jaw 28 pivotally mounted on a pin 30 to one side of the slot 16, the arrangement being such that when the plunger spring is fully expanded and there is no king pin in the coupling, the jaw 28 is swung counter clockwise to a position along side the slot 16. When the tractor is backed up so that the trailer king pin enters the slot 16, it engages the enlarged head 22 of the plunger to drive it to the right in FIG. 2 against the force of the spring. As the plunger head moves to the right, the rack teeth drive the jaw clockwise in FIG. 2 across the slot 16 and behind the king pin. As the jaw moves to its fully closed position a corner 32 thereof engages the face of a retracted bolt 34 which is releasably retained in its retracted position by engagement of a pin 35 thereon with one side of a detent projection 36 on the lower edge of slot 38 in a control lever 40 which is pivoted at 42 to the fifth wheel plate and provided with a spring loaded operating rod 44 which may be pulled against the force of its spring (not shown) to move the bolt 34 from its lock position of FIG. 2 to its jaw released position of FIG. 4 where it is retained by engagement of the bolt pin 35 with the opposite side of the detent projection 36 until the bolt is again triggered by engagement of the jaw therewith for movement into its locking position.

When the jaw and enlarged plunger head 22 are in their coupling position of FIGS. 1 and 2, it will be observed, particularly in FIG. 1, that they define a vertical opening having an upper cylindrical recessed part 42 and a reduced diameter lower cylindral part 44. The recessed upper part 42 of the opening is of a size which is intended to substantially closely encompass the upper cylindrical part 46 of the convential king pin 48 shown in FIG. 1 having a second reduced diameter, intermediate cylindrical part 50 which is intended to be substantially closely encompassed by the lower part 44 of the opening in the jaw and plunger head when they are in closed position.

The king pin has a lower cylindrical third part 52 defining a flange whose diameter as specified in the SAE handbook referred to above is slightly less than the diameter of the upper cylindrical part 46. When the king pin is properly positioned relative to fifth wheel plate 10, the pin occupies the phantom line position of FIG. 1 with the upper part 46 of the pin being seated in the upper recessed part 42 of opening defined by the jaw and plunger head of the coupling, with the central reduced diameter part 50 of the pin being received in lower reduced diameter part 44 of the opening with the pin flange 52 being located beneath the opening to prevent vertical separation of the pin and plate 10.

As explained above, should the trailer landing wheels be extended too far for the particular tractor fifth wheel plate, it is possible for the pin flange 52 to lie in the plane of the upper portion 42 of the coupling opening. Under these conditions the flange would engage the plunger head in the region of the recessed portion causing the plunger, jaw and bolt to operate in a normal manner except that instead of encompassing the entire pin, only the flange 52 would be encompassed by the upper recessed portion of the opening as shown in full lines in FIG. 1. Under these conditions the flange 52 would rest in the recess 42 and as the operator drives slowly away, the trailer would follow in an apparently normal manner. It may not be until the tractor trailer combination is on the highway at increased speed that, upon encountering a bump, the king pin flange could jump out of the recessed upper portion of the opening with consequent damage and possible serious injury to other motorists.

Figure 3:
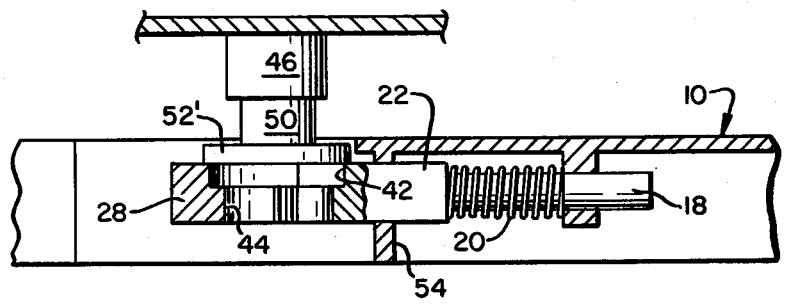
FIG. 3 shows a king pin constructed in accordance with the present invention whose flange is seated over the recess defined by the closed plunger head and jaw of FIGS. 1 and 2.

The present invention aims to prevent the above described type of accident by so constructing the king pin that regardless of the condition of the jaw and bolt, the flange of the pin cannot be received in the recess at the upper end of the opening defined by the plunger head and jaw in closed position. In accordance with the invention this is achieved by making the flange 52', as seen in FIG. 3, predeterminedly larger than the upper cylindrical part of the pin and any part of the opening defined by the jaw and plunger head in closed position such that, should the flange be in a critical plane just sufficiently below the top of the opening to move the jaw and bolt to closed and locked position beneath the flange, the flange 52' is of a size whereby it cannot seat within the recess. In addition to this, the flange is made critically oversized so that even if it should abut solidly against the recessed part of the plunger head, the jaw will still not be able to move to its fully closed, bolt triggering position due to the obstruction presented by the enlarged head as can be seen in FIG. 4.

It should be understood that the flange should not just be slightly larger than the upper end of the opening but it must be of a size to positively prevent the jaw from moving to its fully closed position.

In Harris U.S. Pat. No. 1,981,233, referred to above, for example, it is apparent that the king pin, as illustrated in FIG. 4, is machined from a cylindrical member which provides a pair of flanges, one each at the upper and lower ends of the pin, a first upper portion of diameter smaller than that of the flanges for seating in the recessed position of the coupling opening, and a second lower portion of lesser diameter than the first upper portion for reception in the lower reduced diameter portion of the coupling opening. With such an arrangement, the lower-most flange is incidently shown as having a slightly greater diameter than the recess in the opening defined by the closed jaw and plunger. However, the problem which the present invention addresses was not recognized at the time U.S. Pat. No. 1,981,233 issued nor for decades thereafter (see SAE Handbooks, ibid) and it should be apparent that the flange can be somewhat larger than the recess and still operate the jaw and plunger sufficiently to trigger the bolt for movement into its locking position.

In the present invention, the diameter of the lower flange is made predeterminedly larger than the recess of the opening that no matter how much farther the plunger may be moved to the right (in FIG. 4 of the present application, say,) the jaw 28 can never move a sufficient distance clockwise in FIG. 4 to its fully closed and bolt triggering position of FIG. 2. Thus when the pin flange is accidently positioned so as to lie in the elevated plane of the recessed part of the plunger head 22 and abuts the plunger head in this region, so long as the plunger can move no further to the right in FIG. 4, for example beyond the stop provided by the plate rib 54, as seen in FIG. 4 the jaw 28 cannot move fully across the slot to trigger the release of the bolt 34. When the jaw cannot close at all, even a cursory investigation should reveal to the operator that the king pin is not properly connected to the fifth wheel plate, but even if the operator does not observe this, the instant he drives off, the trailer front end will drop to the ground. Though this may cause some property damage to the trailer or its contents, this would be insignificant relative to the damage that would occur if the trailer were to separate from the tractor on the open road traveling at highway speed.

It has been found that the critical oversized diameter need not necessarily be larger than the transverse width of the slot 16, but it is within the purview of the invention to make the diameter of the lower pin flange substantially larger than the width of the slot as shown at 52" in FIGS. 5–9.

In FIGS. 5, 6 and 7 the diameter of the pin flange is selected to coincide with the width of the throat at a preselected position 56 outwardly of the slot 16 as shown in FIG. 6. Thus if the pin is in the correct plane, as the fifth wheel plate is backed under the pin the plate is pivoted about the trunnion 12 and the enlarged flange is permitted to enter the throat 14 of the plate as it is tilted to a horizontal position with continued backing of the tractor moving the slot relative to the pin until the plunger head 22 is engaged by the pin and the latter locked in towing position as described above. On the other hand, should the trailer be initially too high relative to the fifth wheel plate, the flange 52" would engage the plate at a position inwardly or to the right of the position 56 in FIG. 6 and as the plate tends to move to its horizontal position, its upper surface to either side of the throat and slot to the right of the position 56 would engage the underside of the flange as shown in FIG. 7 with the result that it would be almost impossible for the operator not to realize that the pin has no connection at all with the fifth wheel plate except by the frictional engagement of the flange surface with the plate. Should the operator nevertheless fail to realize the true state of affairs, the instant he drives off, the trailer front end would drop to the ground.

It may be desirable to provide depending side walls 58 at the entrance of the slot as shown in FIGS. 8 and 9 to positively prevent the entrance of the pin into the slot except when the pin is properly positioned relative to the fifth wheel plate. Because the walls 58 must not interfere with the swinging of the jaw 28 across the slot, the walls must have a length such that they are clear of the swinging movement of the jaw. To ensure this, it may be necessary to foreshorten the throat as shown at 14' in FIG. 9. An advantage of this arrangement is that in every case where the king pin is initially too high, except when it is grossly above the plate upper surface, the king pin is prevented from jamming beneath the fifth wheel plate tending to lift the rear end of the tractor off the ground as it is backed towards the plate. By preventing such action right at the beginning, the operator is made immediately aware of the problem and can adjust the trailer landing wheels to ensure that the pin will pass into the slot with the flange properly positioned.

Though the invention has been described as used in conjunction with the well-known swinging jaw type of coupling, it will be apparent that the invention is susceptible for use with any type of fith wheel coupling of the type wherein some form of coupling member swings from a slot-clear position to enable a king pin to enter the slot to a position across the slot where the coupling member is releasably locked in place. No change would be required in the kin pin constructed as described herein to prevent miscoupling or partial coupling regardless of the type of coupling actually used. The king pin is, however, susceptible of modification and changes without departing from the scope and spirit of the appended claims.

What is claimed is:

1. A king pin for a fifth wheel coupling of the type comprising a plate having a slot for receiving said pin during relative coupling movement of said pin and said plate, jaw means pivoted to said plate and movable from an open position enabling said king pin to enter said slot to a closed and locked position across said slot to releasably lock said king pin in coupled condition to said plate, jaw opeating means in the path of movement of said king pin into said slot arranged to be contacted by said king pin to effect automatic movement of said jaw means from its open to its closed and locked position, said king pin having a first upper cylindrical part for rigid attachment to the underside of a trailer, an intermediate cylindrical part of less diameter than said upper part, and a lower cylindrical part defining a flange of greater diameter than said intermediate part, said jaw means in its closed and locked position defining a vertical opening having an upper recessed part of a size to substantially closely encompass a portion of the upper part of said king pin received therein and a lower reduced diameter part of a size to substantially closely encompass said intermediate reduced diameter part of said king pin, said flange being arranged normally to engage said jaw means below the opening defined thereby in closed and locked position to prevent vertical separation of said king pin from said jaw means, the diameter of said flange being predeterminedly greater than the diameter of the upper part of said king pin as to prevent positively said jaw means moving to its fully closed and locked position about said flange should the latter contact said jaw operating means during relative coupling movement of said pin and said plate.

2. The combination of the king pin of claim 1 and said slotted plate, downwardly extending vertical side walls at least at the entrance of the slot in said plate, the diameter of said flange of said king pin being greater than the transverse spacing of said side walls and the depth of said walls being less than the spacing between the top of said flange and the bottom of said trailer whereby said pin is prevented from entering said slot whenever said flange is positioned in a horizontal plane which intersects said side walls.

* * * * *